United States Patent
Adachi

[15] 3,669,867
[45] June 13, 1972

[54] OPTICAL SURFACE GENERATING APPARATUS

[72] Inventor: Iwao P. Adachi, Lexington, Mass.
[73] Assignee: Itek Corporation, Lexington, Mass.
[22] Filed: April 15, 1968
[21] Appl. No.: 721,471

[52] U.S. Cl..............................204/224, 51/165, 51/284, 90/13.5, 90/13.7, 156/345, 204/140.5, 204/212, 219/69 E
[51] Int. Cl..............................B23p 1/02, C23b 5/76, E05d 15/22
[58] Field of Search..............................204/224, 212, 140.5; 51/165, 51/143, 284; 90/13.7, 13.4, 13.9

[56] References Cited

UNITED STATES PATENTS

| | | | |
|---|---|---|---|
| 2,814,237 | 11/1957 | Schmid | 90/13.4 |
| 3,238,675 | 3/1966 | Abbott et al | 51/165 |
| 3,301,776 | 1/1967 | Hughes | 204/143 |
| 3,463,720 | 8/1969 | Wilkinson | 204/143 |
| 2,848,410 | 8/1968 | Kauth-Winterfeld et al. | 204/140.5 |
| 3,293,162 | 12/1966 | Sullivan | 204/224 |
| 3,338,807 | 8/1967 | Clifford | 204/143 |
| 3,466,235 | 9/1969 | Williams | 204/143 |
| 3,474,013 | 10/1969 | Inove | 204/143 |

Primary Examiner—J. H. Mack
Assistant Examiner—Regan J. Fay
Attorney—Homer O. Blair, Robert L. Nathans, Lester S. Grodberg and John E. Toupal

[57] ABSTRACT

A surface generating system wherein a polishing electrode comprising a continuous stream of electrolyte is used to selectively polish an optical blank. During movement over the blank's surface, the electrode is selectively energized by a sensor element synchronously moving over a guide retaining information regarding contour errors on the surface blank.

14 Claims, 9 Drawing Figures

Inventor:
Iwao P. Adachi,
by John E. Toupal
Attorney

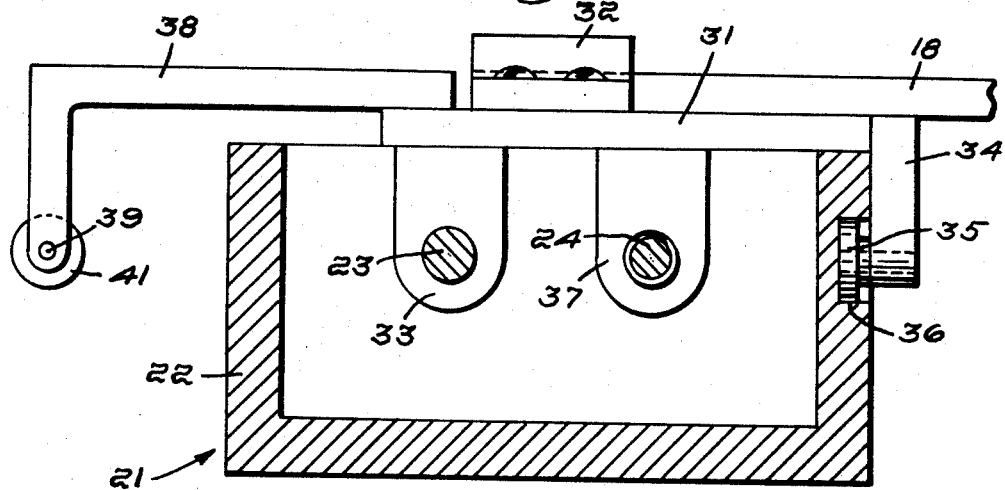
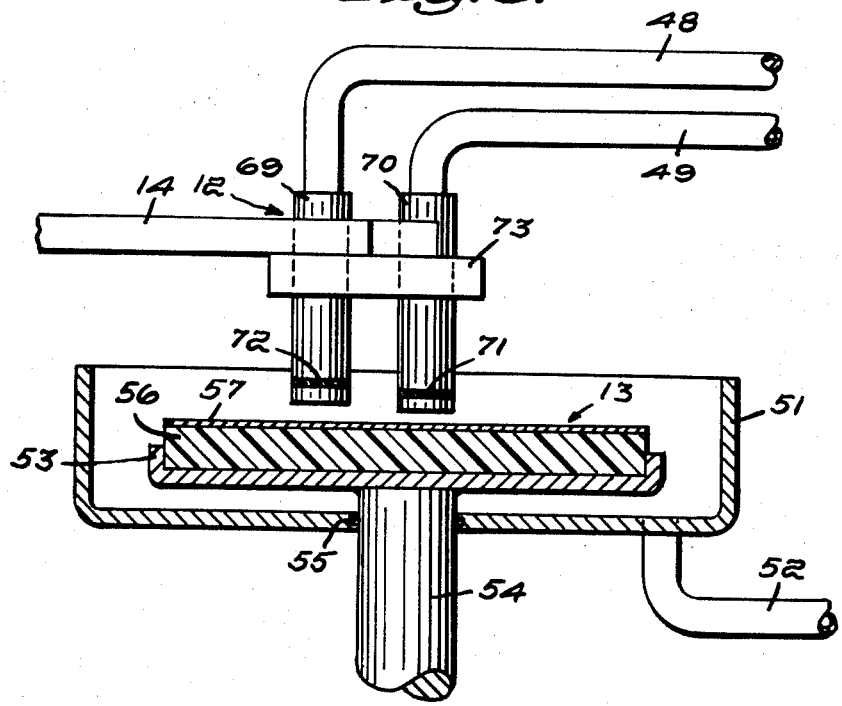

Inventor:
Iwao P. Adachi,
by John E. Toupal
Attorney

Inventor:
Iwao P. Adachi,
by John E. Toupal
Attorney

OPTICAL SURFACE GENERATING APPARATUS

BACKGROUND OF THE INVENTION

This invention relates generally to a method and apparatus for generating optical surfaces. More particularly, the invention relates to method and apparatus for correcting asymmetrical imperfections in the surfaces of optical blanks.

According to known methods, optical surfaces are ground and polished by utilizing completely empirically developed techniques. The practice of optical surface generation in accordance with these techniques suffers from a number of significant disadvantages including requirements for lengthy processing and for highly skilled technicians. Furthermore, since such empirically developed techniques are designed to produce symmetrical alteration of optical surfaces, they are generally inappropriate for eliminating asymmetrical deviations from a desired surface contour. This latter deficiency is particularly troublesome with regard to relatively large optical surfaces of, for example, 50-inch diameter and larger in which rotational asymmetries and random irregularities are more prominent than in smaller surfaces. Also known are so-called template grinding systems wherein a polishing tool is controlled by a guide having a surface configuration conforming to the surface contour desired for the optical blank. The surface quality produced with such systems is limited obviously by both the precision of the mechanical equipment used and the exactness of the guide itself. Furthermore, template systems are similarly unsuitable for correcting asymmetrical surface errors. Thus, a general need exists for improved optical surface generation systems and especially for generation systems capable of producing asymmetrical surface changes.

The object of this invention, therefore, is to provide an improved optical surface generating system that can be selectively controlled to eliminate asymmetrical imperfections in an optical surface.

CHARACTERIZATION OF THE INVENTION

The invention is characterized by the provision of an optical surface generating system including a surface modifying means movable along the work surface of an optical blank in a path including in sequence a plurality of discrete areas thereon, a guide device retaining indicia regarding the initial contour of the work surface, a sensor element movable relative to the guide device, a synchronizing mechanism for synchronizing the movements of the sensor element and the surface modifying means, and a controller for altering the relative elevational changes produced in the discrete areas by the surface modifying means in response to the position of the sensor element with respect to the guide device. In this system, the use of a contour information retaining guide device to control movement of a surface modifying means permits selective modification of the optical work surface. Therefore, asymmetrical irregularities can be eliminated in a precise, programmed manner. Furthermore, the required equipment costs of the system are relatively small compared to those of more complex systems.

One feature of this invention is the provision of an optical surface generating system of the above type wherein two components of relative movement are produced between both the work surface and the surface modifying means and between the guide device and the sensor element. In a preferred embodiment, the two dimensional relative movement is provided by synchronously rotating the optical blank and guide device and by synchronously reciprocating the surface modifying means and sensor element. In this arrangement, the desired two dimensional relative movement is obtained with relatively simple and inexpensive equipment.

Another feature of this invention is the provision of an optical surface generating system of the above type wherein the guide device is a contour map of the work surface, the sensor element moves over the surface of the contour map and the surface modifying means responds to the position of the sensor element with respect to the contour lines on the contour map. Specially prepared contour maps are highly suitable for use as guides to control selective modification of the optical surface.

Another feature of this invention is the provision of an optical surface generating system of the above type wherein surface portions between certain contour lines on the contour map are sensitized and the controller either activates or deactivates surface modifying action of the surface modifying means in response to movement of the sensor element over the sensitized surface portions. With this embodiment, a high degree of surface polishing selectiveness is provided with a relatively simple on-off control system.

Another feature of this invention is the provision of an optical surface generating system of the above featured type wherein the sensor element comprises spaced electrodes movable on the surface of the contour map and the sensitized map surface portions are electrically conductive. Movement of the spaced electrodes onto a sensitized surface portion completes an electrical circuit which either activates or de-activates the surface modifying means.

Another feature of this invention is the provision of an optical surface generating system of the above featured types wherein the surface modifying means comprises a source of surface polishing electrical energy suitable for removing material from the work surface of the optical blank. Because of the ease with which they can be controlled, electrical energy surface polishing mechanisms are particularly well suited for use in this application.

Another feature of this invention is the provision of an optical surface generating system of the above type including a position compensator which modifies the effectiveness of the surface modifying means in dependence upon its radial position over the work surface. The variation in surface modification effectiveness compensates for the different tangential speeds of radially spaced discrete areas on the rotating work surface.

The invention is characterized further by the provision of an optical surface generating system comprising an anode electrode adapted for electrical connection with the conductive work surface of an optical blank, a cathode electrode, a blank support adapted to support the optical blank with its work surface spaced adjacent the cathode electrode, drive means for producing relative transverse movement between the cathode electrode and the work surface, and an electrolyte maintenance means for maintaining a body of electrolyte between the cathode electrode and the work surface. According to this system, programmed electrolytic polishing of an optical work surface is produced by selectively moving the cathode electrode relative to the work surface.

Another feature of the invention is the provision of an optical surface generating system of the above type wherein the electrolyte maintenance means comprises a fluid supply unit which supplies a stream of electrolytic fluid between the cathode electrode and the work surface. The continuously supplied stream of electrolyte functions as an electrode as well as ion exchange media and limits the surface region being polished to that area directly contacted by the electrolyte column. In addition, the agitation produced by the continuously circulated electrolyte reduces the formation of reactionary products on the work surface thereby improving the quality of the finished surface.

Another feature of the invention is the provision of an optical generating system of the above featured type wherein the fluid supply unit includes a fluid supply tube mounted for movement with the cathode electrode and adapted to circulate electrolyte from a supply reservoir over the cathode electrode and onto the work surface of the optical blank. Preferably, the electrolyte reservoir is a vessel disposed to collect electrolyte discharged onto the optical blank's work surface thereby providing a closed fluid circulation system.

The invention is characterized further by the provision of a method for generating optical surfaces comprising the steps of providing an electrical connection between an anode electrode and a conductive work surface of an optical blank, positioning a cathode electrode adjacent the work surface, providing a body of electrolyte between the cathode electrode and the work surface, establishing an electrical potential between the anode and cathode electrodes, and moving the cathode electrode in a predetermined transverse path relative to the work surface. The predetermined path is selected so as to produce electrolytic polishing of discrete predetermined regions on the work surface of the optical blank.

Another feature of this invention is the provision of a method of the above type wherein the body of electrolyte comprises a stream of electrolytic fluid continuously circulating between the cathode electrode and work surface. According to this method, the agitation produced by the streaming electrolyte prevents the formation of reactionary products on the optical blank's work surface and on the surface of the cathode electrode.

Another feature of the invention is the provision of a method of the above featured type wherein the work surface is created by depositing a film of electrically conductive material on an optical blank formed of an electrically non-conductive material. The deposited film of electrically conductive material permits the exercise of electrolytic polishing on a blank formed of a conventional optical material such as glass or plastic.

Another feature of this invention is the provision of a method of the above featured type wherein the conductive material deposited upon the optical blank comprises chromium or rhodium. Because of both their physical and optical properties, chromium and rhodium are uniquely suited for use as a surface coating material in this application.

These and other characteristics and features of the present invention will become more apparent upon a perusal of the following specification taken in conjunction with the accompanying drawings wherein:

FIG. 2 is a cross-sectional view taken along the lines 2—2 of FIG. 1;

FIG. 3 is a cross-sectional view taken along the lines 3—3 of FIG. 1;

Figure 1:
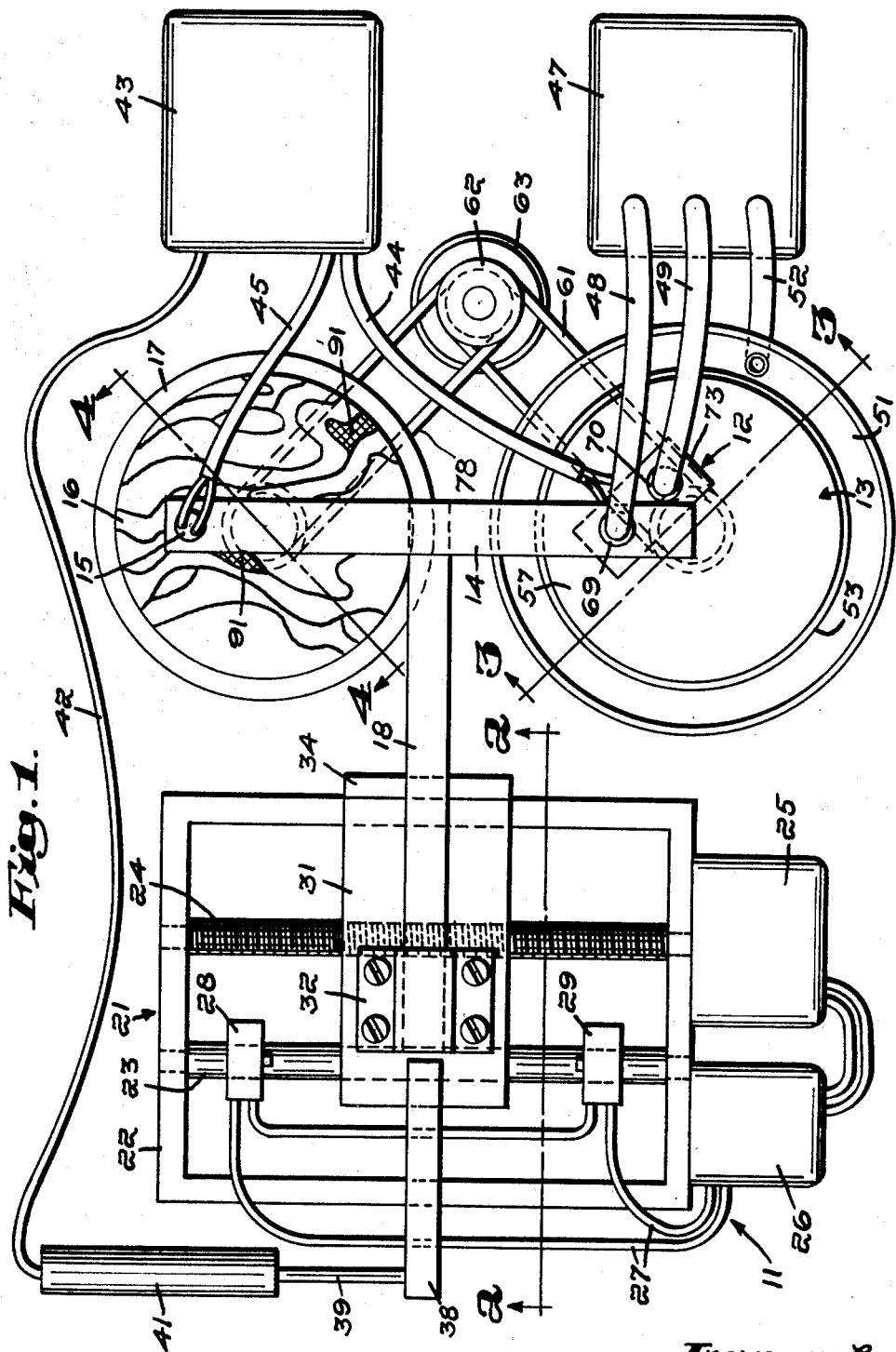
FIG. 1 is a schematic plan view of a preferred embodiment of the invention.

Referring now to FIG. 1 there is shown the optical surface polishing system 11 including the surface modifying assembly 12 mounted above the optical blank 13. Supporting the assembly 12 is one end of the arm 14 having an opposite end supporting the sensor element 15. A guide mechanism including the contour map 16 and supporting turntable 17 are disposed below the sensor element 15.

The support bar 18 is connected between the mid-portion of the arm 14 and the drive assembly 21. Included in the drive assembly 21 is the housing 22 which supports the ball slide 23 and the worm shaft 24. Mounted on the housing 22 is the power supply 26 and associated motor 25 operatively coupled to the worm shaft 24. The electrical leads 27 connect the contact switches 28 and 29 with the power supply 26.

As shown in FIG. 2, the support bar 18 is secured to the transport table 31 by the mounting block 32. Supporting one end of the transport table 31 is the slide bearing 33 adapted for longitudinal movement along the ball slide 23. The opposite end of the transport table 31 is supported by the bracket 34 that terminates with rollers 35 that are retained by and adapted for movement within the groove 36 in the side wall of the housing 32. Internal threads on the collar 37 engage the worm drive 24 so as to produce movement of the transport table 31 in response to rotation thereof.

Secured to, for movement with the transport table 31 is the angle arm 38 having an end attached to the adjustment rod 39 of the voltage dividing potentiometer 41. The electrical cable 42 connects the potentiometer 41 to the power supply 43 which supplies electrical energy to the surface polishing assembly 12 through the electrical cable 44. Also connected to the power supply 43 by the electrical cable 45 is the sensor element 15.

The fluid supply unit 47 includes a supply tank and conventional fluid pump that circulates fluid through the supply tubes 48 and 49 for discharge by the polishing assembly 12. Fluid discharged by the assembly 12 contacts the optical blank 13 and is accumulated in the collection vessel 51. A closed system is provided by the return tube 52 that conveys fluid back to the supply unit 47 from the collection vessel 51.

As shown more clearly in FIG. 3, the optical blank 13 is mounted on the support plate 53 within the collection vessel 51. Fixed for rotation with the plate 53 is the shaft 54 that extends through the fluid seal 55 in the bottom wall of the collection vessel 51. The optical blank 13 comprises the electrically non-conductive substrate 56 composed, for example, of optical glass or plastic and the deposited layer 57 of electrically conductive material. Rotation of the shaft 54 and plate 53 is produced by the belt 61 which is driven by the wheel 62 of the drive motor 63, as shown in FIG. 1.

Referring again to FIG. 3, the surface polishing assembly 12 includes the screen anode electrode 71 disposed within the rigid terminal portion 70 of the fluid supply tube 49 and the screen cathode electrode 72 disposed within the rigid terminal portion 69 of fluid supply tube 48. The anode and cathode electrodes 71 and 72 and the fluid supply tubes 48 and 49 are supported by the mounting plate 73 secured to one end of the arm member 14. Electrical energy is supplied to the anode and cathode electrodes 71 and 72 from the power supply 43 by leads included in the electrical cable 44.

Figure 4:
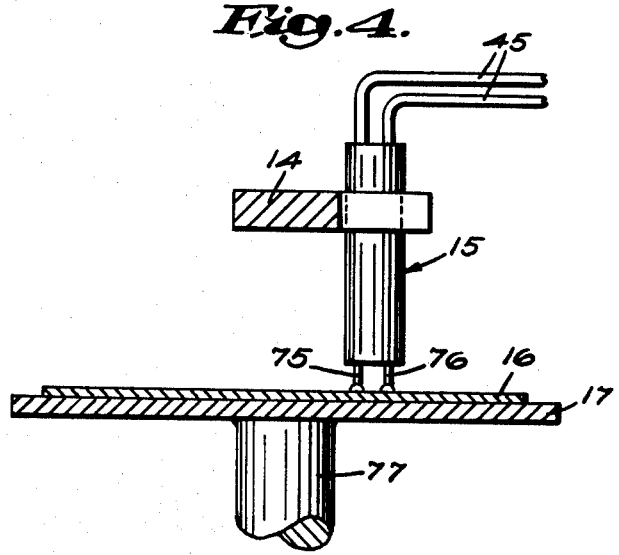
FIG. 4 is a cross-sectional view taken along the lines 4—4 of FIG. 1.

As shown in FIG. 4, the sensor element 15 comprises the spaced apart brush electrodes 75 and 76 mounted for movement along the surface of the contour map 16. The electrodes 75 and 76 are connected to the power supply 43 by the electrical leads 45. Supporting the turntable 17 is the shaft 77 which also is driven by the drive wheel 62 (FIG. 1) via belt 78. Thus, the contour map 16 and the optical blank 13 are synchronously driven at equal rotational speeds by the drive motor 63.

Figure 5:
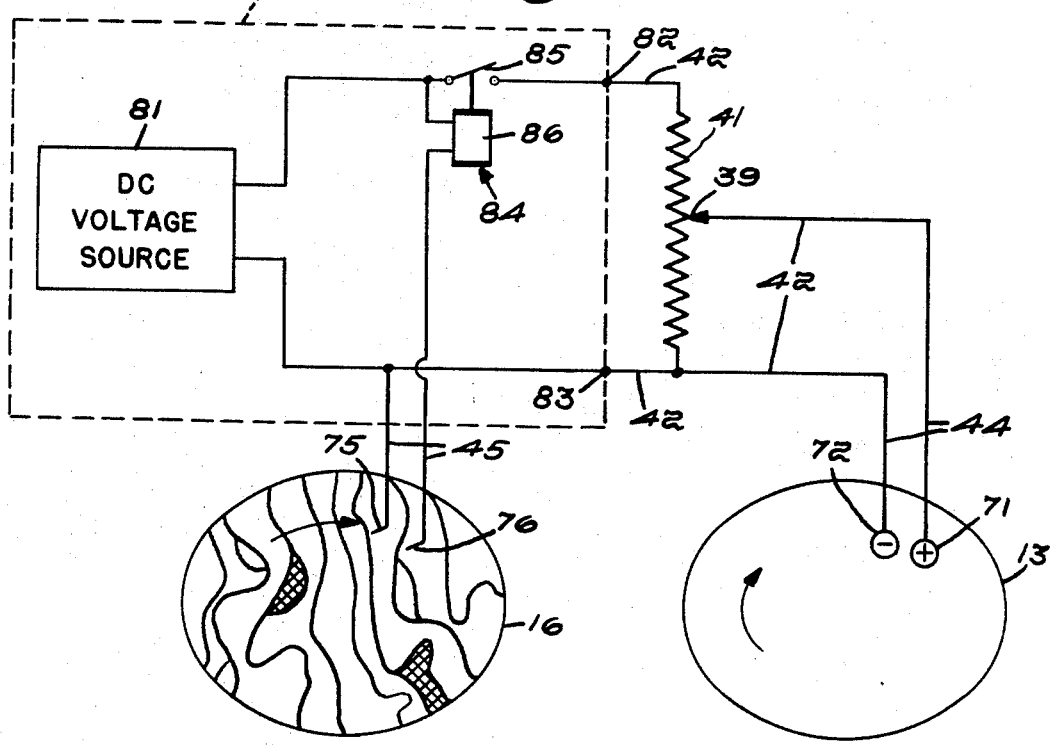
FIG. 5 is a circuit diagram illustrating a control system for the surface generating embodiment shown in FIG. 1.

The control circuit for the surface modification system 11 is illustrated in FIG. 5. As shown, the power supply 43 includes the dc voltage source 81 that excites a dc potential between output terminals 82 and 83. Also included in the power supply 43 is the relay 84 having the normally open switch contact 85 connected between the voltage source 81 and positive output terminal 82. The winding 86 of the relay 84 is connected in series with the brush contacts 75 and 76 directly across the dc voltage source 81. Coupled across the output terminals 82 and 83 is the rectilinear potentiometer 41, the output of which is connected to the anode and cathode electrodes 71 and 72 of the surface polishing assembly 12.

During operation of the system 11, the fluid supply unit 47 is actuated to produce a continuous flow of an electrolyte through the fluid supply tubes 48 and 49. Suitable electrolytes include, for example, nickelous sulphate solutions or potassium nitrate solutions. The continuously pumped electrolyte flows over the anode and cathode electrodes 71 and 72 and is discharged as a stream onto the conductive coating 57 of the optical blank 13. After excitation of the electrodes 71 and 72 by the power supply 43, the discharging streams of electrolyte function both as electrodes and as ion exchange media. Accordingly, electrolytic polishing action occurs on that area of the coating 57 directly below the cathode electrode 72.

The disassociation of ions from the surface coating 57 produced by the electrolytic action results in a gradual displacement of material therefrom. The rate and type of material removal effected are influenced by various factors including the power output of the power supply 43, the kind of electrolyte used, the spacings of the electrodes 71 and 72 from the surface 57, etc. In a preferred embodiment, the electrodes 71 and 72 are excited by one microsecond pulses that produce momentary densities of 5–15 amperes per square foot. This output establishes a satisfactory rate of surface polishing without completely dissolving the film layer 57. The pulsed signal can be established in the power supply 43, for example, by a conventional current interrupter such as a vibrator.

The agitation produced by the continuously circulating electrolyte prevents formation of the reaction products normally associated with an electrolytic process. For this reason, the surface of film coating 57 is maintained clean thereby both insuring a constant rate of material removal and enhancing the surface quality of the finished product. Furthermore, since surface polishing occurs only in the particular area directly below the electrolyte column emanating from the cathode electrode 72, the surface 57 can be selectively polished by appropriate movement of the assembly 12 as described more fully below. Thus, the use of a continuously circulating body of electrolyte permits selective polishing of discrete areas and produces high quality finished surfaces.

Relative movement between the surface modifying assembly 12 and the optical blank 13 is introduced by energizing both the drive motor 63 and the drive assembly 21. Rotation of support plate 53 produces a circumferential component of relative movement between the surface 57 and the cathode electrode 72. Simultaneously, rotation of the turntable 17 produces a synchronized circumferential component of relative movement between the contour map 16 and the sensor element 15. As described further below, this latter movement controls the excitation of the electrodes 71 and 72 and thereby the surface modification produced by the polishing assembly 12. Additional, radially directed components of relative movement between the cathode electrode 72 and the optical surface 57 and between the sensor element 15 and the contour map guide 16 are produced by reciprocal movement of the transport table 31 as follows. Responsive to energization of the motor 25, the rotating worm 24 drives the operatively engaged transport table 31 in a reciprocating movement between the contact switches 28 and 29. Upon each contact between the table 31 and either of the switch contact 28 and 29, the motor power supply 26 is activated in a conventional manner to reverse the rotational direction of the drive motor 25. Thus, the transport table 31 is driven in a reciprocating motion between the switch contacts 28 and 29. Consequently, the integrally connected cathode electrode 72 and the sensor element 15 are synchronously driven in reciprocating radially disposed paths above, respectively, the optical surface 57 and the contour map 16. Because of the two components of relative movement, the cathode electrode 72 and the sensor element 15 pass over all surface portions of, respectively, the optical surface 57 and the contour map 16. Furthermore, because both the rotational movements of the optical blank 13 and the contour map 16 and the reciprocating movements of the sensor element 16 and the cathode electrode 72 are in synchronism, the relative position of the sensor element 15 above the contour map 16 is always directly related to the relative position of the cathode electrode above the optical surface 57.

During its movement relative to the optical surface 57, the sensor element 15 periodically passes over sensitized contour map regions 91. According to a preferred method, a layer of electrically conductive copper is applied to sensitize the regions 91. Thus, when the brush electrodes 75 and 76 of the sensor element 15 contact a sensitized region 91, a conductive path is established through the relay winding 86 as illustrated in FIG. 5. This closes switch contacts 85 and results in the application of source voltage across the anode and cathode electrodes 71 and 72. Consequently, the surface modifying assembly 12 is activated to produce surface polishing. Conversely, when the brush electrodes 75 and 76 are in contact with non-sensitized regions of the contour map 16, the relay winding 86 is deenergized, switch contacts 85 remain open and the surface polishing assembly 12 is de-activated. It will be obvious, therefore, that selective polishing of the optical surface 57 can be achieved by sensitizing predetermined portions of the contour map 16.

Figure 6:
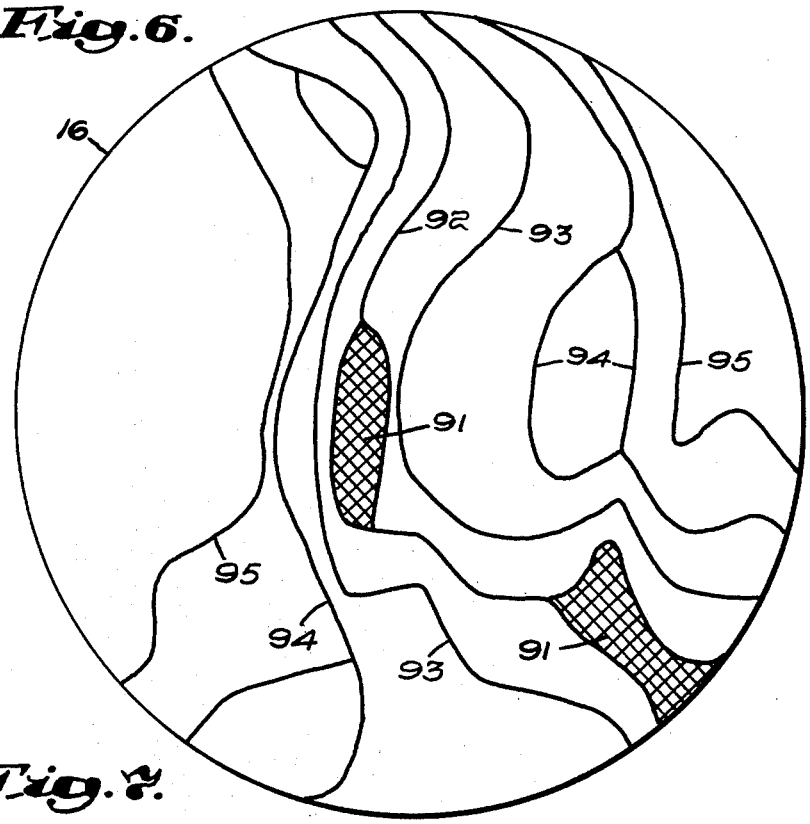
FIG. 6 is a plan view of a contour map for use with the invention embodiment shown in FIG. 1.

According to a preferred method embodiment of the invention, the surface 57 of the optical blank 13 is measured with suitable test apparatus. The measurements can be made mechanically, for example, with dial indicators or traversing probes. However, the measurements preferably are made in the conventional manner by an interferometer which produces an interference picture indicating the contour characteristics of the surface 57. The surface information provided by the interference picture then is used to produce the typical contour map 16. As shown in FIG. 6, the contour map 16 possesses contour lines each representing points on the surface 57 of a constant elevational error with respect to a desired reference. For example, the lines 92 represent points on the surface 57 lying 20 elevational units above a desired reference, lines 93 represent points lying 15 elevational units above the desired reference, lines 94 represent points lying 10 elevational units above the desired reference, and lines 95 represent points lying 5 elevational units above the desired reference. Accordingly, it will be obvious that generation of the surface desired on the optical blank 13 requires removal of larger volumes of material from those portions of the surface 57 represented by contour lines 92 than by those portions represented by contour lines 93. Similarly, a larger volume of material must be removed from those portions of the surface 57 represented by the contour lines 93 than from those portions represented by the contour lines 94, etc. However, since the contour lines 92–95 and, therefore, the surface errors represented thereby are asymmetrical, an irregular pattern of material removal is required to produce the desired surface contour. It is precisely this type of asymmetrical surface correction that cannot be readily accomplished by conventional polishing systems but that is produced according to the present invention in a highly precise and predictable manner as described below.

First, the map regions 91 defined by the highest contour error lines 92 and containing no other contour lines are covered with an electrically conductive coating, of, for example, copper. Naturally, the regions 91 represent areas on the surface 57 having the greatest elevational errors. The map 16 then is placed on the turntable 17 and accurately aligned thereon with respect to the optical blank 13. The alignment is such that the sensor element 15 lies directly above that particular area of the contour map 16 representing the corresponding area of the blank surface 57 above which the cathode electrode 72 is positioned. Since, as noted above, the various components move in synchronism, it will be obvious that once established this relationship will persist. Thus, the sensor element 15 and cathode electrode 72 will be disposed continuously above corresponding areas of, respectively, the contour map 16 and the optical surface 57. Next, the drive motor 63 is energized to produce rotation of the blank support plate 53 and the turntable 17, and the motor 25 is energized to produce reciprocating movement of the sensor element 15 and the surface polishing assembly 12.

During each movement of the sensor element 15, over the conductively coated regions 91, voltage is applied between the anode and cathode electrodes 71 and 72 as described above. Consequently, electrolytic polishing occurs in those areas of the optical surface 57 represented by the contour map regions 91. However, when the sensor element 15 is above all portions of the contour map 16 except for the sensitized regions 91, the anode and cathode electrodes 71 and 72 are de-activated so as to interrupt the surface polishing process. This phase of the polishing operation is continued for a given time period of sufficient length to effect removal of predetermined material volumes from those areas of the optical surface 57 represented by the contour map regions 91. The predetermined volumes of surface material correspond to approximately 5 of the elevational units represented by the contour lines 92–95. Thus, the contour errors of the surface areas denoted by the map regions 92 are reduced to values less than 20 elevational units but greater than 15 elevational units.

Figure 7:
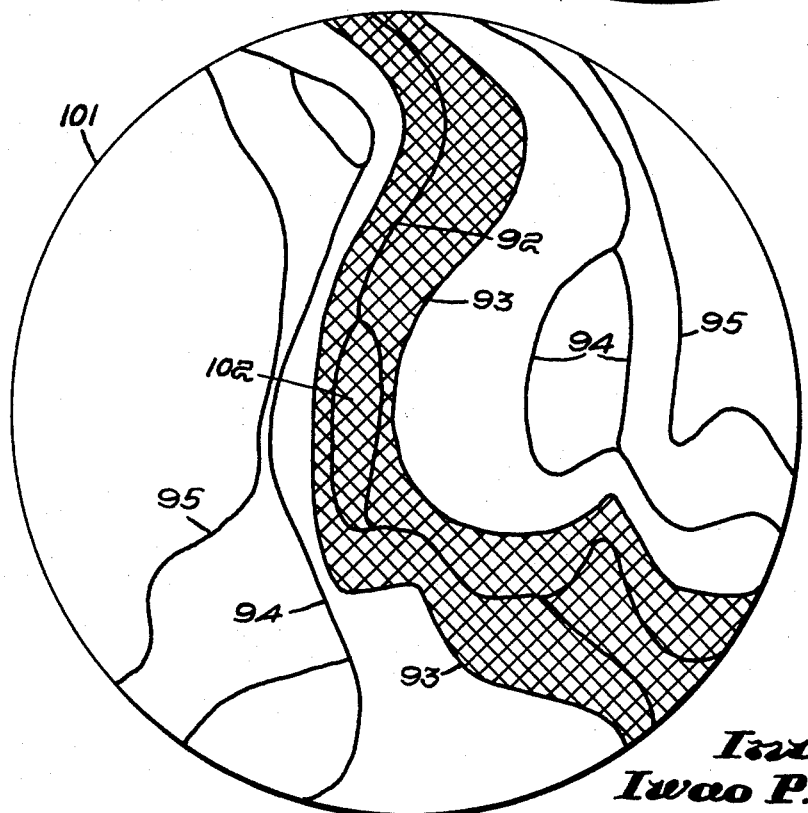
FIGS. 7-9 are plan views of other contour maps suitable for use with the invention embodiment shown in FIG. 1.

After completing the first phase of the polishing process, the contour map 16 is removed from the turntable 17 and replaced by the contour map 101 illustrated in FIG. 7. The map 101 is identical to map 16 except that the sensitized regions 91 of map 16 have been supplanted by the sensitized region 102 also formed, for example, by the application of an electrically conductive layer of copper. The sensitized region 102 is defined between contour lines 93 and contains only contour lines 92. Thus, the region 102 represents that area of the optical surface 57 having contour errors of greater than 15 elevational units. Again, the contour map 101 is accurately aligned with respect to the optical blank 13 and the above described polishing process resumed. This second surface polishing phase continues for another given period of sufficient length to effect removal of a predetermined volume of material. During this period the relative elevation of the surface 57 represented by region 102 is reduced by approximately 5 elevational units. Thus, the prescribed area possesses a contour error of greater than 10 but less than 15 elevational units.

Figure 8:
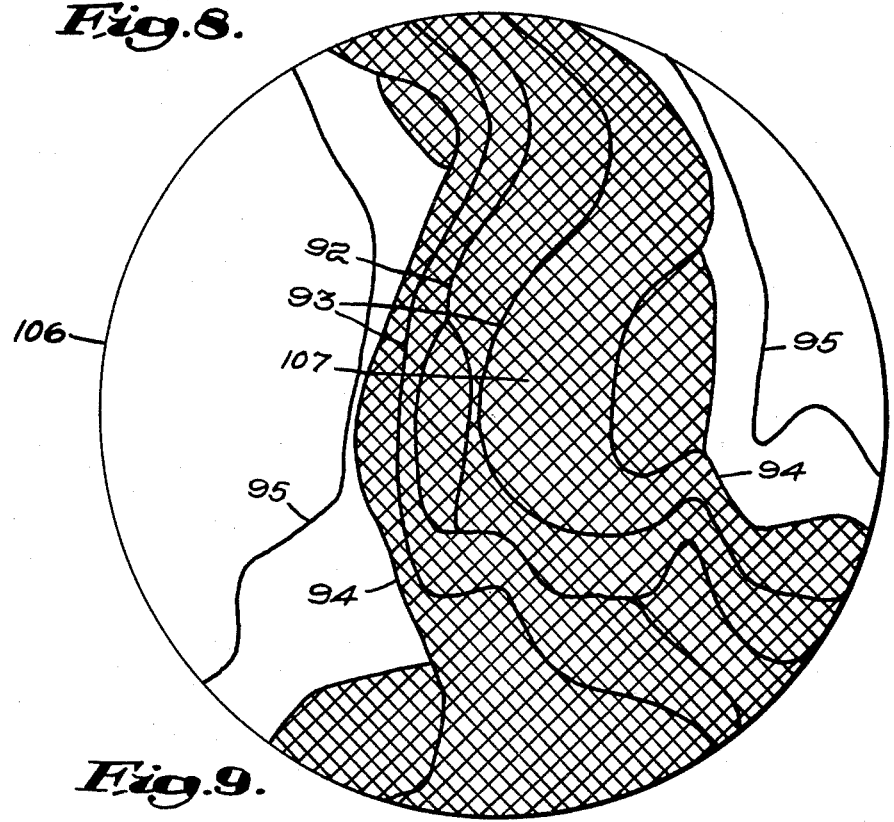
Figure 9:
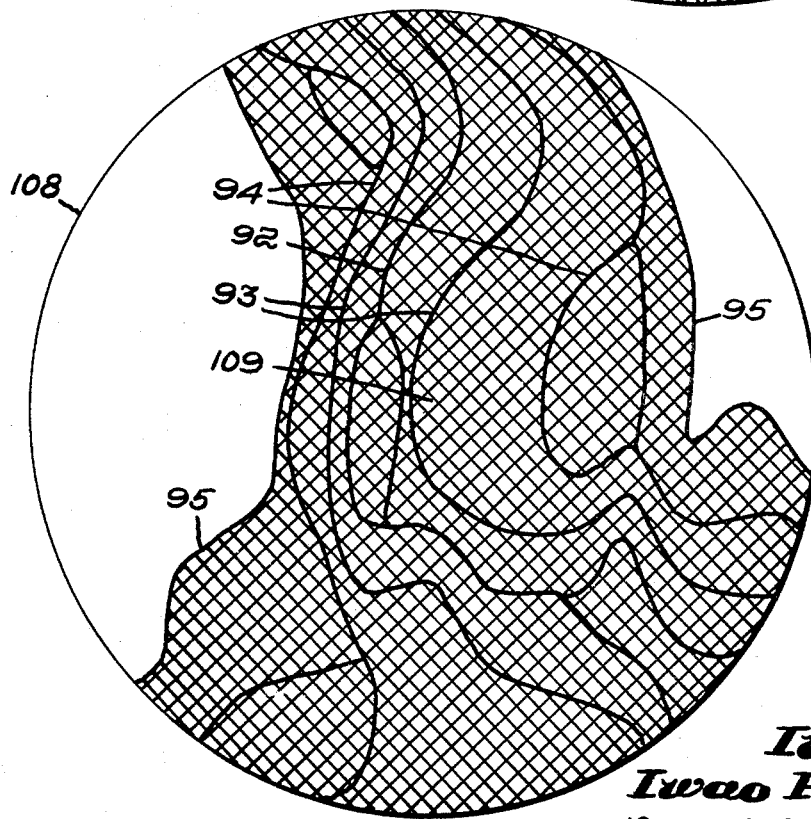

For the next phase of the process, contour map 101 is replaced by contour map 106 (FIG. 8). Map 106 has a sensitized region 107 defined by that map area lying between contour lines 94 and containing contour lines 92 and 93. Upon completion of this phase in the manner described above, the area of the optical surface 57 represented by the sensitized region 107 exhibits relative contour error values of greater than 5 but less than 10 elevational units.

During the final phase of the process, the map 105 is replaced by the contour map 108 having a sensitized region 109 lying between the contour lines 95 and containing contour lines 92, 93 and 94. After completion of this final phase in the manner described above, the entire optical surface 57 possesses relative contour error values of less than 5 but greater than 0 elevational units. Thus, the maximum relative contour error of greater than 20 elevational units that existed initially is reduced to a maximum of less than 5 elevational units. Furthermore, the reduction in maximum relative surface error is obtained in a highly efficient and predictable manner with relatively simple and inexpensive equipment.

Referring again to FIG. 1, it will be noted that during reciprocal movement of the transport table 31, the potentiometer 41 is adjusted by movement of the rod 39. The variable settings of the potentiometer 41 produce corresponding variations in the current supplied to the anode and cathode electrodes 71 and 72 as indicated by the circuit diagram of FIG. 5. Preferably, a relationship is established between the potentiometer 41 and the drive assembly 21 such that the potentiometer 41 provides a variable output current that increases linearly in dependence upon the radial distance of the cathode electrode 72 from the center of the optical blank 13. Thus, a minimum value of polishing current is applied when the cathode electrode 72 is over the center of the optical blank 13 and a maximum value is applied when the cathode electrode 72 is over the outer edge thereof. The variable rates of material removal produced by the changing current tend to compensate for the different tangential speeds of radially spaced discrete areas on the surface 57 of the rotating blank 13. For example, although disposed beneath the cathode electrode 72 for shorter periods of time than are inner portions of surface 57, the outer portions thereof are subject to compensating higher current densities. For this reason the actual rates of surface polishing produced in all radial areas of the surface 57 are somewhat equalized. It will be appreciated that in certain applications other more sophisticated relationships between applied current and radial position may be found desirable.

Although useful in other surface generation applications, the present invention is particularly well suited for correcting the surfaces of optical glass reflectors to an accuracy of an order of a few hundredths of a wavelength ($\lambda$). This is the application illustrated in FIG. 3 wherein the glass substrate 56 is adapted for electrical polishing techniques by the deposition of the metal coating 57. In a preferred embodiment of the invention, the surface of the glass blank 56 first is ground and polished and then coated with a metal film 57 having a thickness corresponding to the maximum surface error still existing on the blank's surface. After deposition by, for example, vacuum techniques selective portions of the metal film 57 are removed according to the above described electropolishing process so as to correct irregularities existing on the initial surface of the glass blank 56. Upon completion of the electropolishing process, the corrected metal surface 57 can be over-coated with a suitable material such as aluminum to improve reflectivity. It has been found highly desirable that the original glass blank 56 be initially polished to the extent required for elimination of surface errors greater than $\frac{1}{2} \lambda$. This is because the removal of metal from the surface 57 in amounts corresponding to greater than $\frac{1}{2} \lambda$ is accompanied by a degradation of surface quality. Apparently, the quality reduction results from a surface cloudiness caused by the oxidation that accompanies the electrolytic polishing action.

It has been found that chromium is an uniquely suitable metal for use in forming the conductive layer 57. In addition to a highly desirable hardness, chromium exhibits an adhesion characteristic that enchances its ability to be deposited and retained on the surface of the glass blank 13. Furthermore, chromium produces a highly specular surface with significantly less scattering than do most other metals. It is believed that the high surface quality results from the fact that during the electropolishing process chromium ions are removed individually rather than in clusters. Another vary suitable metal that closely resembles chromium in desirable characteristics is rhodium.

Obviously, many modifications and variations of the present invention are possible in light of the above teachings. For example, although the described method utilizing a continuously circulating stream of electrolyte produces particularly desirable results, it will be appreciated that the invention could be practiced also in a system wherein the electrodes 71 and 72 and the optical blank 13 are fully submerged in an electrolytic bath. Also, control systems other than those shown and described can be used to control movement of the surface modifying assembly 12. Other suitable control methods and systems are disclosed, for example, in the commonly assigned, copending U.S. Application Ser. No. 719,657 now U.S. Pat. No. 3,587,195 of Ronald Aspden entitled "Optical Surface Generating Method and Apparatus," filed Apr. 8, 1968.

Similarly, the described control system could be utilized to control predetermined movements of other surface modifying mechanisms including, for example, ion beams, metal vapor streams, optical laps, etc. It is to be understood, therefore, that within the scope of the appended claims the invention can be practiced otherwise than as specifically described.

What is claimed is:

1. Optical surface generating apparatus for generating a desired contour on the surface of an optical blank comprising blank support means for supporting an optical blank, surface modifying means for altering relative elevations on the work surface of an optical blank supported by said blank support means, drive means for moving said surface modifying means along the work surface in a path including in sequence a plurality of discrete areas thereon, guide means for retaining information regarding the initial contour of the work surface and elevational errors between the initial contour of said work surface and said desired contour, sensor means movable relative to said guide means by said drive means for sensing said information, synchronizing means for synchronizing movements of said sensor means and said surface modifying means, and control means for controlling the relative elevational changes produced in said discrete areas by said surface modifying means in response to the position of said sensor means with respect to said guide means.

2. Optical surface generating apparatus according to claim 1 wherein said drive means is adapted to produce first and second components of relative movement between said surface modifying means and the work surface and first and second components of relative movement between the sensor means and guide means.

3. Optical surface generating apparatus according to claim 2 wherein said drive means produces said first components of relative movement by synchronously moving said guide and the work surface and produces said second components of relative movement by synchronously moving said surface modifying means and said sensor means.

4. Optical surface generating apparatus according to claim 3 wherein said sensor means and surface modifying means are joined by connector means so as to be moved in unison by said drive means.

5. Optical surface generating apparatus according to claim 4 wherein said drive means is adapted to produce rotation of the optical blank and guide means and reciprocating movement of said surface modifying means and said sensor means.

6. Optical surface generating apparatus according to claim 5 including rotary movement compensation means adapted to provide said surface modifying means with a surface modification rate proportional to its radial position with respect to the work surface.

7. Optical surface generating apparatus according to claim 1 wherein said guide means comprises a contour map of the work surface, said drive means is adapted to produce transverse movement of said sensor means over the surface of said contour map, and said control means controls said surface modifying means in response to the position of said sensor means with respect to the contour lines on said contour map.

8. Optical surface generating apparatus according to claim 7 wherein said control means is adapted to activate and de-activate surface modifying action of said surface modifying means in response to the position of said sensor means with respect to said contour lines.

9. Optical surface generating apparatus according to claim 8 wherein surface portions between certain contour lines on said contour map are sensitized, and said control means is adapted to produce either said activating or said de-activating action in response to passage of said sensor means over said sensitized surface portions.

10. Optical surface generating apparatus according to claim 9 wherein said sensor means comprises spaced electrodes adapted for movement on the surface of said contour map, and said sensitized surface portions are electrically conductive.

11. Optical surface generating apparatus for generating a desired contour on the surface of an optical blank comprising blank support means for supporting an optical blank, surface modifying means for altering relative elevations on the work surface of an optical blank supported by said blank support means, drive means for moving said surface modifying means along the work surface in a predetermined path, a plurality of guides for retaining information regarding the initial contour of said work surface, each of said plurality of guides retaining information regarding elevational errors in one of a plurality of discrete areas on said work surface, sensor means movable relative to said guides for sequentially sensing the contour information on each of said plurality of guides, synchronizing means for synchronizing movements of said sensor means and said surface modifying means, and control means for controlling the relative elevational changes produced in each of said discrete areas by said surface modifying means in response to the position of said sensor means with respect to each of said plurality of guides.

12. Optical surface generating apparatus according to claim 11 wherein each of said guides retains information regarding a predetermined range of elevational error relative to a reference elevation, and wherein said sensor means sequentially moves relative to said plurality of guides from the guide retaining information of largest elevational error relative to said reference to the guide retaining information of least elevational error relative to said reference.

13. Optical surface generating apparatus according to claim 12 wherein said guides comprise a plurality of contour maps, the contour lines of each map representing points of constant elevational error relative to said reference.

14. Optical surface generating apparatus according to claim 13 wherein each of said plurality of contour maps have the areas between different contour lines sensitized for the production of activating or deactivating surface modifying action by said surface modifying means in response to passage of said sensor means over said sensitized portions.

* * * * *